(12) United States Patent  
Afshar

(10) Patent No.: US 11,581,780 B2  
(45) Date of Patent: *Feb. 14, 2023

(54) DUAL SPEED MOTOR CONTROLLER AND METHOD OF OPERATION

(71) Applicant: Asia Connection LLC, New York, NY (US)

(72) Inventor: Reza Afshar, Westlake Village, CA (US)

(73) Assignee: Asia Connection LLC, New York, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 17/479,463

(22) Filed: Sep. 20, 2021

(65) Prior Publication Data

US 2022/0006351 A1 Jan. 6, 2022

Related U.S. Application Data

(60) Continuation of application No. 16/704,297, filed on Dec. 5, 2019, now Pat. No. 11,146,141, which is a continuation of application No. 15/685,693, filed on Aug. 24, 2017, now Pat. No. 10,601,280, which is a continuation of application No. 15/611,330, filed on Jun. 1, 2017, now Pat. No. 10,277,091, which is a division of application No. 14/540,383, filed on Nov. 13, 2014, now Pat. No. 9,726,188, said application (Continued)

(51) Int. Cl.
*H02K 5/22* (2006.01)
*H02K 11/33* (2016.01)
*F04D 27/00* (2006.01)
*F04D 13/06* (2006.01)
*F04D 15/00* (2006.01)
*F04D 25/06* (2006.01)

(52) U.S. Cl.
CPC ............. *H02K 5/22* (2013.01); *F04D 27/004* (2013.01); *H02K 11/33* (2016.01); *F04D 13/0686* (2013.01); *F04D 15/0066* (2013.01); *F04D 25/06* (2013.01); *H02K 2203/03* (2013.01)

(58) Field of Classification Search
CPC ...... H02K 5/22; H02K 11/33; F04D 15/0066; F04D 27/004
See application file for complete search history.

(56) References Cited

U.S. PATENT DOCUMENTS 4,309,783 A 1/1982 Cammack et al.
4,545,906 A 10/1985 Frederick
(Continued)

*Primary Examiner* — Rina I Duda
(74) *Attorney, Agent, or Firm* — Dilworth & Barrese, LLP

(57) ABSTRACT

A two-speed motor is mounted in a housing with an end cap. The end cap has a tubular structure defining an interior space, including an open first end connectable to the motor casing. The second end includes at least one planar surface and at least one air grate configured to permit airflow into and/or out of the interior space. A dual speed pump controller includes a motor controller for operating the dual speed motor. The controller includes an operating speed circuit for operating the motor in one of a first speed or a second speed, the first speed being greater than the second speed; an event circuit for operating the motor at the first speed before a predetermined event and operating the pump at the second speed after the predetermined event.

20 Claims, 13 Drawing Sheets

Related U.S. Application Data

No. 15/685,693 is a continuation of application No. 14/536,929, filed on Nov. 10, 2014, now abandoned.

(60) Provisional application No. 61/903,583, filed on Nov. 13, 2013.

(56) References Cited

U.S. PATENT DOCUMENTS

| | | |
|---|---|---|
| 4,686,439 A | 8/1987 | Cunningham et al. |
| 5,170,522 A | 12/1992 | Walker |
| 5,714,816 A | 2/1998 | Jensen et al. |
| 5,763,939 A | 6/1998 | Yamashita |
| 6,070,760 A | 6/2000 | Kenney et al. |
| 6,177,740 B1 | 1/2001 | Burns |
| 6,241,485 B1 | 6/2001 | Warwick |
| 6,652,249 B2 | 11/2003 | Kenney et al. |
| 6,750,578 B2 | 6/2004 | Buening et al. |
| 7,420,302 B2 | 9/2008 | Archer et al. |
| 7,687,945 B2 | 3/2010 | Matin et al. |
| 8,110,954 B2 | 2/2012 | Maeda et al. |
| 8,110,967 B2 * | 2/2012 | Ting .............. H02N 2/108 310/323.01 |
| 8,319,381 B2 | 11/2012 | Hino et al. |
| 8,427,143 B2 | 4/2013 | Lai et al. |
| 2006/0144568 A1 * | 7/2006 | Crocker .......... F04D 13/0646 257/E23.098 |
| 2009/0153001 A1 | 6/2009 | Horng et al. |
| 2009/0297373 A1 | 12/2009 | Xingcan et al. |
| 2011/0217182 A1 * | 9/2011 | Hanewald ............ G01F 1/34 417/1 |
| 2011/0280744 A1 | 11/2011 | Ortiz et al. |
| 2015/0130305 A1 | 5/2015 | Afshar |

\* cited by examiner

DUAL SPEED MOTOR CONTROLLER AND METHOD OF OPERATION

PRIORITY—CROSS REFERENCE TO RELATED APPLICATIONS

This application claims priority as a Continuation of pending U.S. Ser. No. 16/704,297, filed Dec. 5, 2019, a Continuation of U.S. Ser. No. 15/611,330, filed Jun. 1, 2017, a Division of U.S. Ser. No. 14/540,383, filed Nov. 13, 2014 (U.S. Pat. No. 9,726,188), which claims the benefit of U.S. Provisional Application No. 61/903,583, filed Nov. 13, 2013, and as a Continuation of pending U.S. Ser. No. 14/536,929, filed Nov. 10, 2014, which claims the benefit of U.S. Provisional Application No. 61/903,583, filed Nov. 13, 2013, the entire contents of the above referenced applications are incorporated herein by reference.

TECHNICAL FIELD

The present disclosure generally relates to motors operating pumps and pump controllers, systems and methods for controlling pumps in various applications, and more particularly, to a pump having a dual speed pump controller for controlling the operation of recirculating pumps used in swimming pool systems and environments.

BACKGROUND

Standard recirculating pumps are used in swimming pool environments in connection with the pool filtering systems. The pumps are often high capacity pumps that move thousands of gallons per hour. The electric power required to move these large volumes of water is often very high and creates high temperatures in the motor section. Many federal and local governments have enacted laws and regulations to curtail this high electricity use.

The high capacity pumps often generate considerable heat within the housings they are mounted. Controllers often control the operation of a pump motor. Due to high temperatures within the housing of the motor, controllers are usually located remote from the motor and require extensive wiring connections between the controller and motor to control the motor operation. In addition, the controller will often require a separate housing to protect the controller circuitry.

Attempts that have been made to design pumps within the legally required specifications, to include for example, timers, voltage controllers, and flow volume modifications, none of which adequately address the problem at hand.

This disclosure describes improvements over these prior art technologies.

SUMMARY

A motor controller connected to a pump and mounted within a housing is provided. The motor assembly includes a motor controller for operating a dual speed motor, an operating speed circuit for operating the motor in one of a first speed or a second speed, the first speed being greater than the second speed; an event circuit for operating the motor at the first speed before a predetermined event and operating the pump at the second speed after the predetermined event.

A motor housing containing an electric motor is disclosed. An end cap sealing the housing assembly can define an interior space, which can include an open first end connectable to the motor casing. A second end, which can include a first surface; a second surface offset from the first surface and substantially parallel to the first planar surface; and at least one air grate surface substantially perpendicular to the first surface and the planar surface, positioned between and attached to the first surface and the second surface in a stepped configuration. The at least one air grate surface can include at least one air grate configured to permit air flow into and/or out of the interior space.

In the end cap, the at least one air grate surface can include two air grates each positioned substantially along a different radial line of the end cap.

In the end cap, the air grate surface can be one of a planar surface or an arcuate surface.

The end cap can further include circuit board mountings positioned within the interior space configured to attach a circuit board thereto; and end cap mountings positioned to attach the end cap to the electric motor.

In the end cap, the air grate surface can include at least two air grates positioned such that as the motor rotates a directional air flow is created within the interior space generating air flow through the air grates with one air grate as an intake air grate and the other grate as an exhaust air grate.

In the end cap, the air grates can be each positioned substantially parallel to radial lines of the end cap.

In the end cap, the air grate surface can define at least one switch receptacle configured to mount a control switch therein.

Accordingly a method for operating a motor connected to a pump and a controller is provided. The method includes operating the motor by the controller at a first speed for a predetermined amount of time; and after the expiration of the predetermined amount of time, switching by the controller the speed of the motor to a second speed, wherein the first speed is greater than the second speed, without the input or interference from a typical user.

Accordingly a method for operating a motor connected to a pump and a controller is provided. The method includes operating by the controller the pump at a first speed; receiving at the controller pressure data from a pressure detector indicating an output pressure of the pump; if the output pressure is below a predetermined pressure, continuing the operation of the pump at first speed; and if the output pressure is above a predetermined pressure, operating the pump at second speed, wherein the first speed is greater than the second speed, all without input from a user.

Accordingly, a motor assembly having a shaft end and a motor end is disclosed. The motor assembly can include an end cap connectable to the motor assembly at the motor end and defining, e.g., a tubular space therein, which can include a first an open first end connectable to the motor end; a second end, which can include a first planar surface; a second planar surface offset from the first planar surface and substantially parallel to the first planar surface; and at least one air grate surface positioned between the first planar surface and the second planar surface and substantially perpendicular to the first planar surface and the second planar surface, the air grate surface including at least one air grate configured to permit air flow into and/or out of the interior space; and a motor control module having a substantially semi-circular design and configured to be mounted within the tubular space of the end cap and electrically connectable to the motor to provide control to the motor.

In the motor assembly the at least one air grate surface can include two air grates each positioned substantially along a different radial line of the end cap.

In the motor assembly the air grate surface, the first surface and second surface can be one of a planar surface or an arcuate surface.

The motor assembly can further include circuit board mountings sealed within the interior space configured to attach a circuit board thereto; and end cap mountings positioned to attach the end cap to the electric motor, whereby access to the circuit board is restricted.

In the motor assembly the air grate surface can include at least two air grates positioned such that as the motor rotates a directional air flow is created within the interior space generating air flow through the air grates with one air grate as an intake air grate and the other air grate as an exhaust air grate.

In the motor assembly the air grates can be each positioned substantially parallel to radial lines of the end cap.

In the motor assembly the air grate surface can define at least one switch receptacle configured to mount a control switch therein.

Accordingly, disclosed is a control module for controlling a motor and mounted within an interior tubular cavity of a tubular end cap of a motor assembly housing. The control module can include a circuit board having a substantially semi-circular configuration with a diameter less than a diameter of the interior tubular cavity and mountable within the interior tubular cavity.

BRIEF DESCRIPTION OF THE DRAWINGS

The present disclosure will become more readily apparent from the specific description accompanied by the attached drawings, in which.

Like reference numerals indicate similar parts throughout the figures.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Reference will now be made in detail to the exemplary embodiments of the present disclosure, which are illustrated in the accompanying figures.

Controllers are often used to control the operation of a motor. The motors can operate various devices, for example, pumps, vehicles, cooling units, etc. The pumps can be used to move water through a swimming pool filtration system.

Figure 1:
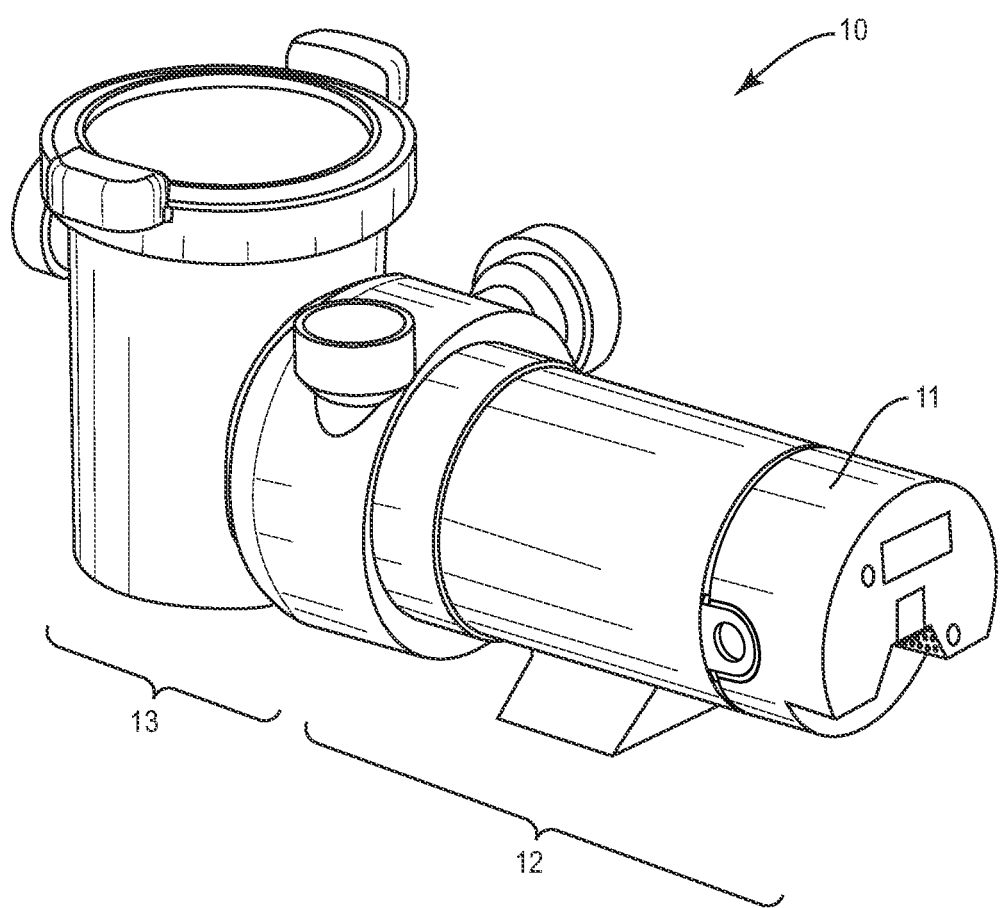
FIG. 1 is a side perspective view of a pump/motor assembly including a motor end cap according to the present disclosure.
Figure 2:
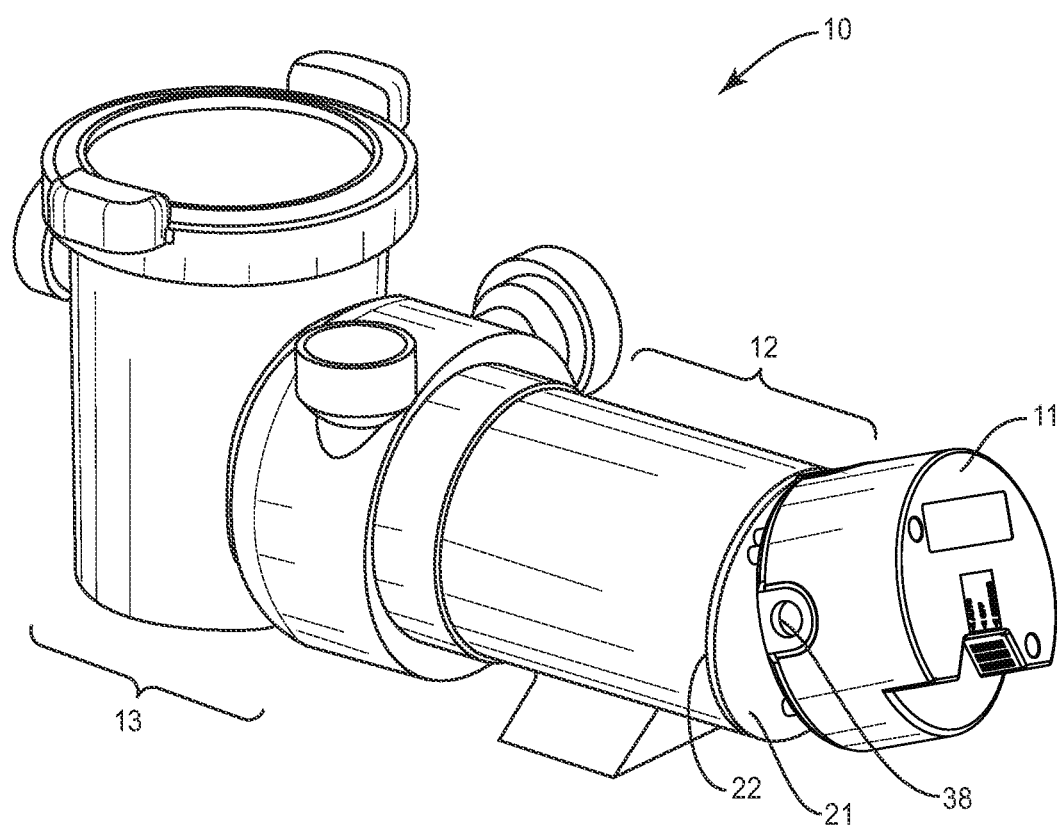
FIG. 2 is a side perspective view of a pump/motor assembly including a partially-removed motor end cap according to the present disclosure.
Figure 8:
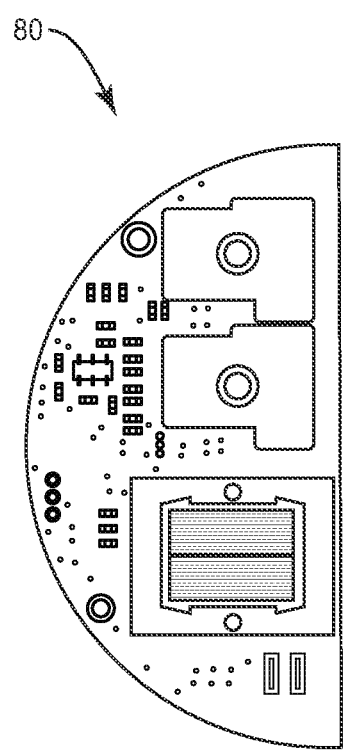
FIG. 8 is a top plan view of a circuit board for use in a motor end cap according to the present disclosure.
Figure 9:
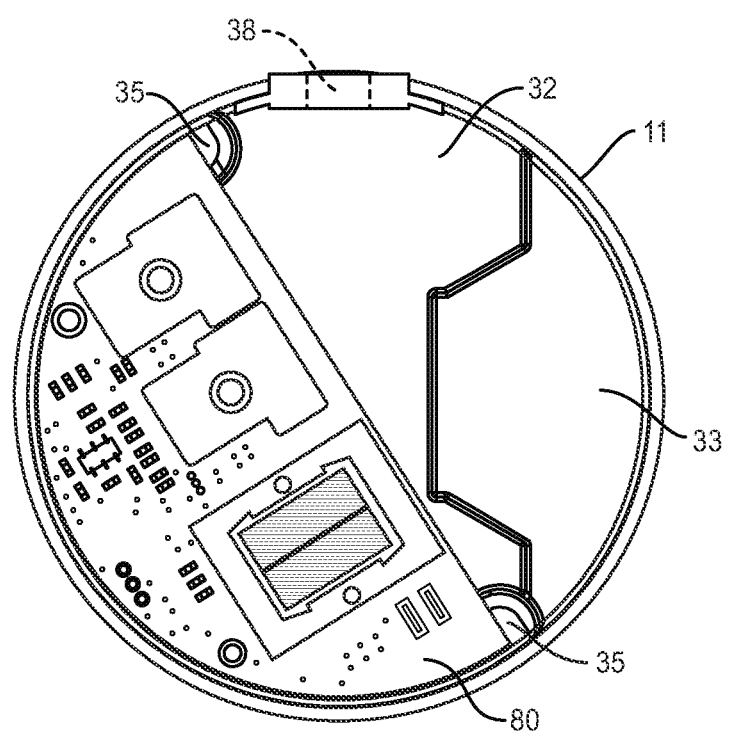
FIG. 9 is a bottom plan view of a motor end cap with a circuit board included therein according to the present disclosure.

Referring to FIG. 1, a pump/motor assembly 10 according to the present disclosure includes a pump section 13 and a motor section 12. Motor section 12 includes novel end cap 11. Controller circuit board 80 (see FIG. 8) is designed to fit within motor end cap 11 as shown in FIG. 9. End cap 11 can be made removable from motor section 12 to expose motor 21 and controller 80 contained within motor housing 22. (See FIG. 2). However, these elements are ordinarily not accessible to the typical user—only to service professionals.

End cap 11 comprises a tubular body 31 (e.g., FIG. 3), open at one end and closed at the other. The closed end includes a first planar surface 32, a second planar surface 33, and at least one air grate surface 34. First planar surface 32 is substantially parallel to second planar surface 33. The at least one air grate surface 34 is substantially perpendicular to and positioned between first and second planar surfaces 32 and 33. The at least one air grate surface 34 includes an air grate 36 to permit airflow therethrough.

Figure 3:
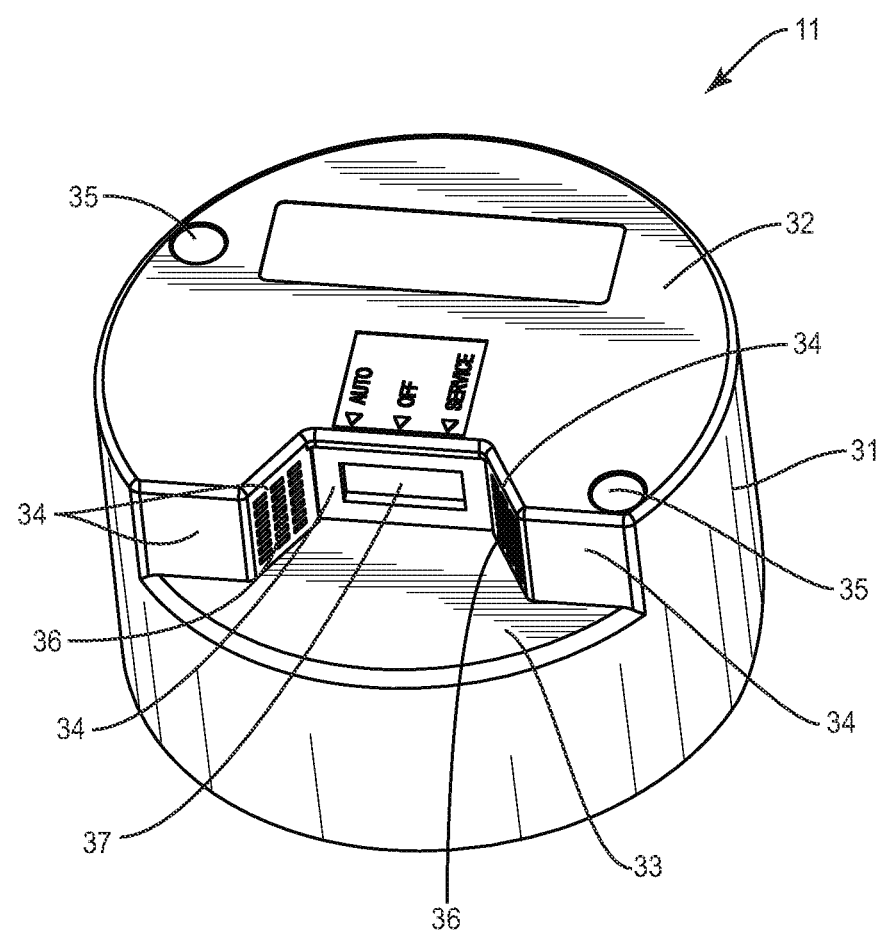
FIG. 3 is a top perspective view of a motor end cap according to the present disclosure.
Figure 4:
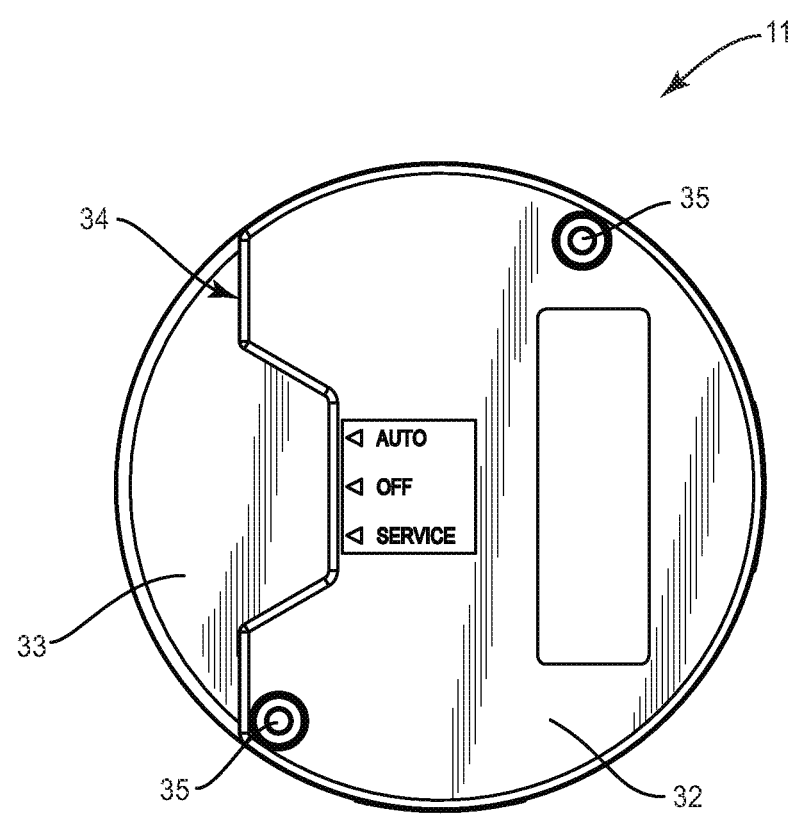
FIG. 4 is a top plan view of a motor end cap according to the present disclosure.
Figure 5:
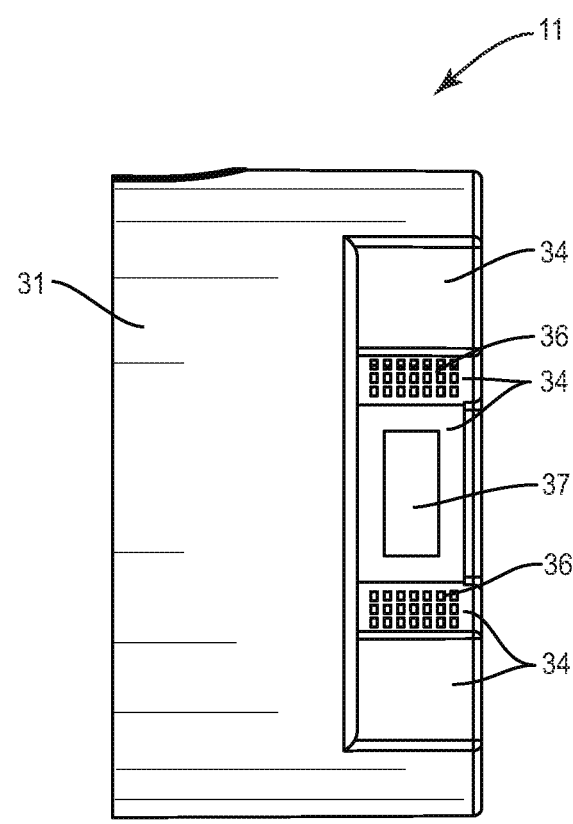
FIG. 5 is a side plan view of a motor end cap according to the present disclosure.

In the embodiment illustrated in FIG. 3, five air grate surfaces 34a-34e are shown, two of which, i.e. 34b and 34d, include air grates 36i and 36e, respectively. In another embodiment illustrated in FIG. 10, one air grate surface 34 is shown, having a single air grate 36. Other configurations varying the number of air grate surfaces 34 and air grates 36 are contemplated. For example, although the air grate surfaces are shown as planar surfaces, as shown in FIG. 11 the air grate surface can be configured as an arcuate surface having one or more air grates positioned thereon. Other configurations having a combination of planar and arcuate surfaces are also contemplated.

The embodiment of FIG. 3 shows a plurality of air grate surfaces connected in series, at least two of which include air grates positioned substantially opposite each other such that as the motor rotates a directional air flow is created in the interior space with one air grate being an intake air grate and the other grate being an exhaust air grate.

In operation, as the motor spins, air currents will be produced through air grates 36. The air currents will flow into and out of the interior of end cap 11. This continuous air flow will continuously cool the interior of end cap 11 and thus cool controller circuit board 80, thus protecting controller circuit board 80 from overheating without the removal of end cap 11.

Figure 7:
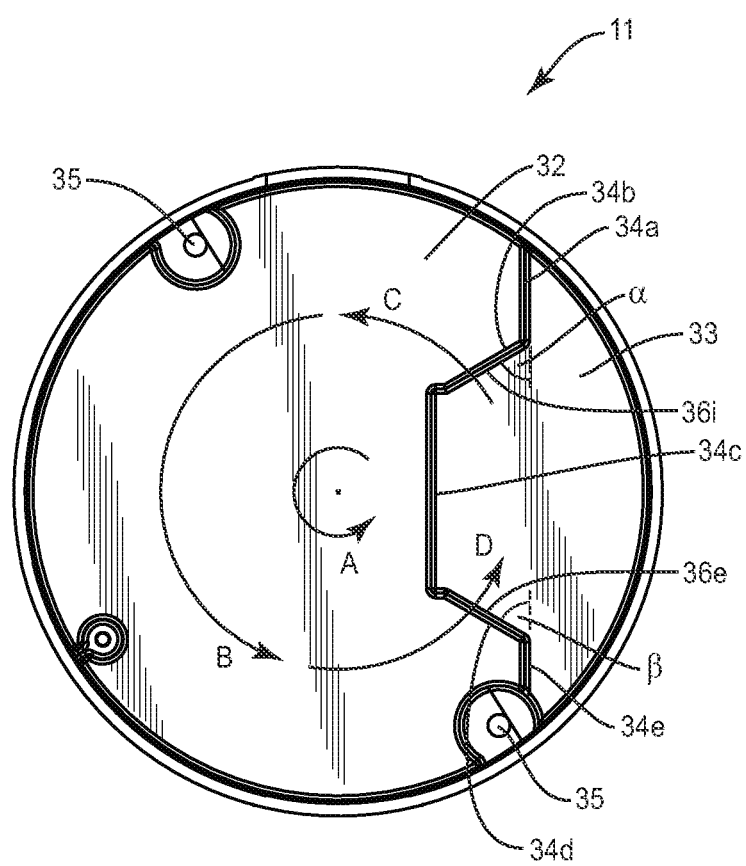
FIG. 7 is a bottom plan view of a motor end cap according to the present disclosure.

In a preferred embodiment and described with reference to FIG. 7, planar surface 34 includes 2 air grate surfaces 34b and 34d, each including an air grate 36. The positioning of surfaces 34b and 34d is selected to maximize the air flow produced as an effect of the rotation of the motor with end cap 11 in place. As the motor rotates about axis z in a direction A, the rotation causes air flow within tubular body 31 in a direction B. Intake air grate 36i permits air flow into tubular body 31 in a direction C and exhaust air grate 36e permits air flow out of tubular body 31 in a direction D. Angles α and β are selected to maximize the air flow and can change based on the position of the planar surfaces 34b and 34d. Air flow can be maximized when an air grate is substantially perpendicular to the air flow at the position of the air grate. In other words, air grates positioned substantially along radial lines of the end cap can maximize the air flow. In addition, although the configuration shown is substantially symmetrical about a line between the 2 air grates, other non-symmetrical designs are contemplated.

Figure 10:
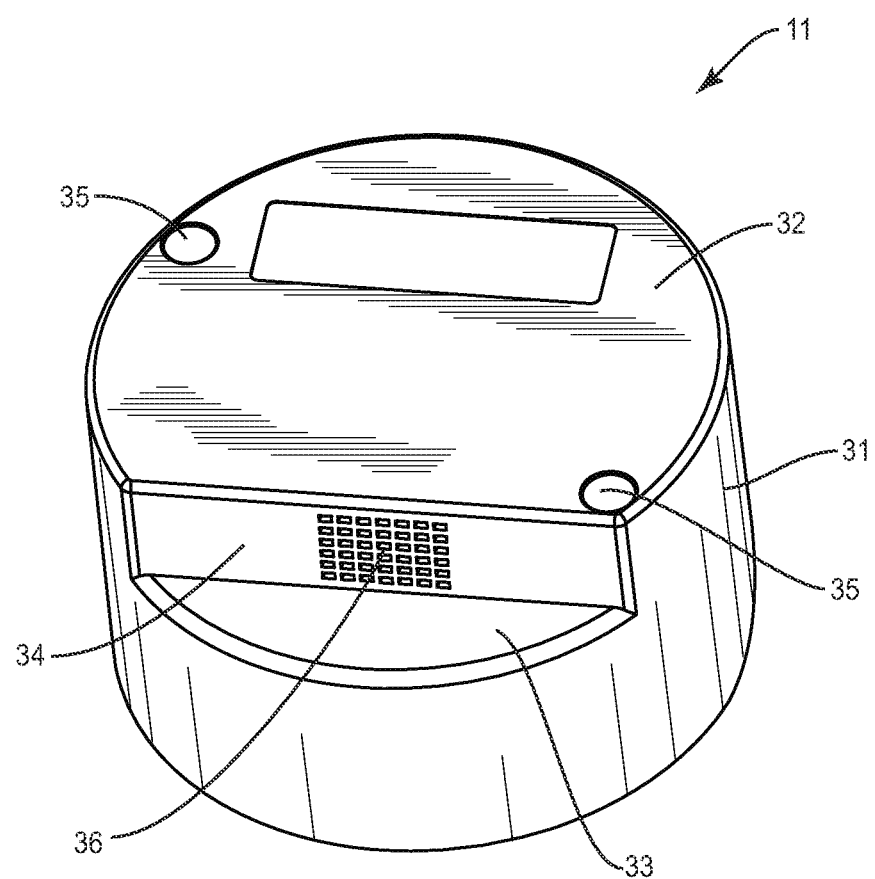
FIG. 10 is a top perspective view of a motor end cap according to the present disclosure.
Figure 11:
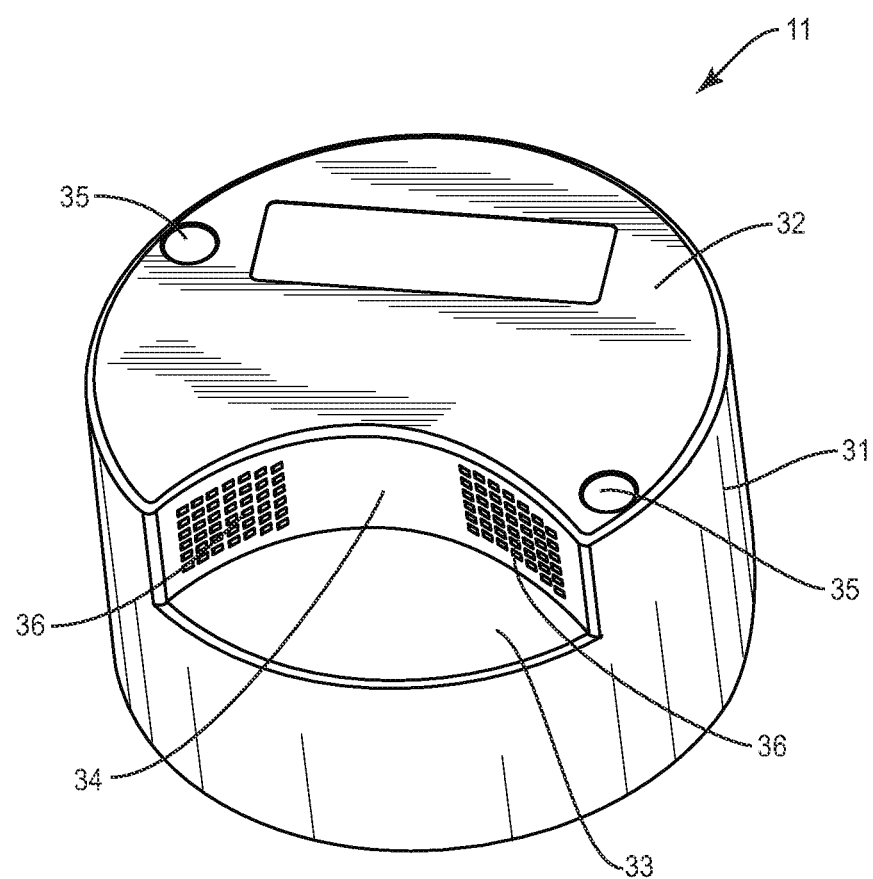
FIG. 11 is a top perspective view of a motor end cap according to the present disclosure.

In the embodiment of FIG. 10, the air flow can be further maximized if the single planar surface 34 is provided with 2 air grates spaced apart from each other and the planar surface is positioned substantially on a diameter line of the end cap. This will position the air grates substantially perpendicular to the direction of the air flow at the each air grate.

Also shown in FIG. 3 is optional switch cut-out 37 positioned within one of the at least one air grate surfaces 34 into which a switch (not shown) can be mounted to provide input to the controller circuit board 80 as described below. Also included can be screw receptacles 35 to receive a screw to attach end cap 11 to motor housing 22 and/or motor 21. End cap 11 can also include a power cord access 38 to permit connection of electric power to the electrical components of the pump/motor assembly 10.

Figure 6:
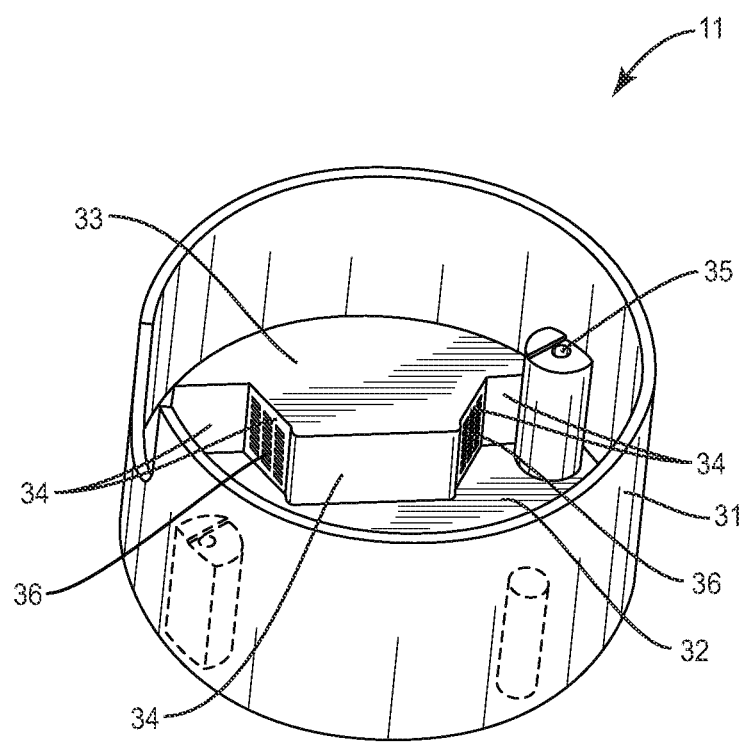
FIG. 6 is a bottom perspective view of a motor end cap according to the present disclosure.

The interior of end cap 11 is mostly hollow and designed to seal controller circuit board 80. For example, a typical inside diameter of an end cap might be 5½ inches in diameter. If so, end cap 11 would have that same inside diameter. Controller circuit board 80 is specially designed as a semi-circle having a diameter of 5¼ inches to fit within the interior of end cap 11 (see FIG. 6) as shown in FIG. 9. By sealing the electronics within end cap 11, they can be made inaccessible to typical users, but can be accessed by service professionals.

The present disclosure has been described herein in connection with a pump/motor assembly in a swimming pool environment, but is applicable to any electric motor that requires cooling in its end cap. Other applications are contemplated.

Figure 12:
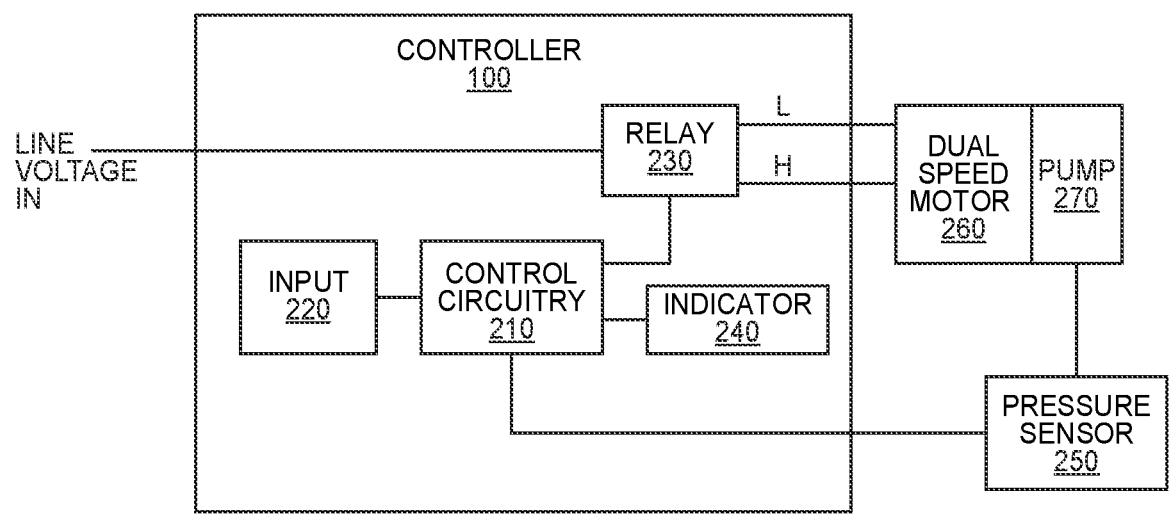
FIG. 12 is a block diagram illustrating a controller for controlling a dual speed pump according to the present disclosure.

FIG. 12 is a block diagram illustrating an embodiment of a dual speed pump controlled according to the present disclosure. Controller 100 comprises control circuitry 210, an input device 220 and a relay 230. In other embodiments, controller 100 can also include an indicator(s) 240. Controller 100 is connected to a dual speed motor 260 which in turn is connected to a pump 270. Input line voltage is routed via relay 230 to either the low speed or high speed connections of motor 260. In other embodiments, a pressure detector, such as a pressure sensor 250 can be connected to pump 270 and control circuitry 210 to provide pressure data from pump 270 to controller 100.

Control circuitry 210 is designed to implement the method for operating controller 100 and automatically switch pump motor 260 between its low speed and high speed of operation without user input. Control circuitry 210 can be electronic circuitry configured or a microprocessor programmed to switch relay 230 based on the method of control described herein.

Input device 210 is available to select between different modes of operation, including a normal operating mode and a service operating mode. In addition, input device 210 is available to select between different voltage input levels, if available, e.g. 120 V or 240 V. Input device 210 can be implemented as one or more switches, including, but not limited to, dip switches, slide switches, push button switches and/or toggle switches.

Indicator(s) 240 can include lights and/or display devices to indicate the settings of controller 100, e.g. normal operating mode at high speed or service mode at low speed. For example, indicator(s) 240 can include light emitting diodes (LEDs), incandescent bulbs, digital displays, etc.

For priming, at startup, pressure sensor(s) 250 can be included to sense an output pressure of pump 270 when priming is complete and automatically switch to a lower speed. Pressure sensor(s) 250 can include pump outlet water taps or electronic devices to sense when priming is complete, such as by measuring current draw caused by the load on the pump.

Motor 260 can be any motor manufactured to operate at more than one speed. Although motor 260 is described herein as having an internal configuration to operate at various speeds, an external speed controller is contemplated and would be automatically controlled by controller 100. Motor 260 can include low speed, high speed and service settings. The use of differing speeds can reduce the total power consumption, for example, to ⅛ the power consumption of uncontrolled use.

Pump 270 can be any mechanical pump for moving liquids. The present disclosure discusses swimming pool applications, but the present disclosure is not limited thereto.

In operation, controller 100 is an electronic switch assembly which controls input motor 260 to operate in three modes, an automatic mode without user interference, an off mode or a service mode for service technicians. None of these modes permit user input. In the automatic mode, motor 260 is operated at a high speed until the occurrence of an event and is then switched to a low speed mode. The event can be the end of a specific preset time limit (e.g. 5 minutes, 10 minutes, etc.) or the reaching of a threshold pressure sensed by electronic sensor or pressure sensor 250 at the output of the pump 270, that signifies the pump is primed; other events are contemplated. In the service mode, motor 260 is permitted to run for a longer period of time (e.g. 3 hours) if high speed service mode is selected and is then switched back to low speed mode after the expiration of the preset duration. Motor 260 will then continue to run in low speed until power is interrupted.

Figure 13:
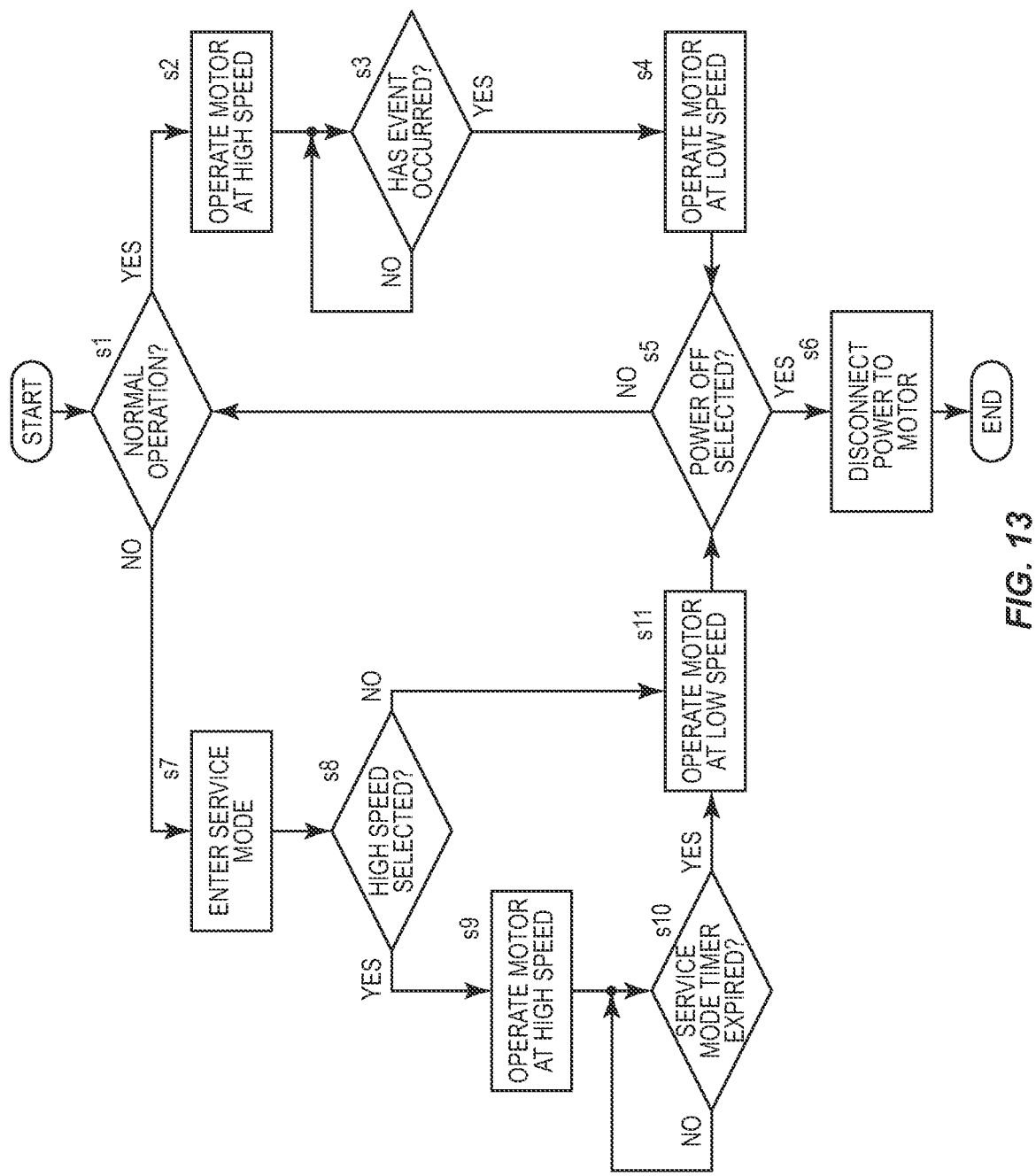
FIG. 13 is a flow diagram illustrating a method for controlling a dual speed pump according to the present disclosure.

FIG. 13 is a flow diagram illustrating a method for controlling a dual speed pump according to the present disclosure.

In step s1, control circuitry 210 determines if the process should begin normal operation. This determination is made based on the input of a user using the input(s) 220. If normal operation is selected, the process continued to step s2, else the process continues to step s7, without user interference. In step s2, controller 100 operates motor 260 at a high speed. In step s3, control circuitry 210 determines if the predetermined event has occurred. If so, the process continues to step s4, else the process returns to step s3. It is noted that the event can be, for example, the expiration of a timer or the reaching of a pump output pressure sensed electronically. In step s4, if the event has occurred, controller 100 operates motor 260 at a low speed. In step s5, if controller 100 is instructed to switch off the power, the power is switched off in step s6, else the process returns to step s1.

If normal automatic operation is not selected in step s1, in step s7 process enters the service mode. In step s8, the control circuitry 210 determines if a high speed is selected based on the input of a service user via input 220, and if selected proceeds to steps 9, else to step s11. In step s9, if a high speed is selected, controller 100 operates motor 260 at a high speed. In step s10, control circuitry 210 determines if the service mode timer has expired. If not, the process returns to step s10. If the service mode timer has expired in step s10 or if the high speed is not selected in step s8, in step s11, controller 100 operates motor 260 in a low speed.

The present disclosure has been described herein in connection with a pump in a swimming pool environment that is normally operated in an automatic mode, without user input or interference, or in a service mode made by a service user. Other applications are contemplated.

Where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A motor assembly, comprising:
   a housing having an interior with a first portion and a second portion;
   a motor mounted within the first portion of the housing and not the second portion, the motor constructed and adapted to operate within the first portion at two speeds, a low speed and a high speed, faster than the low speed, and a motor controller adapted to control operation of the motor, electrically coupled to the motor, and mounted within the second portion of the housing and not the first portion, the second portion of the housing including an air flow opening structure to permit air flow communication into and out of the second portion;
   the motor controller including an operating speed circuit configured or programmed to automatically cause the motor to operate at the low speed or the high speed, based on the occurrence of a selected event;
   the motor, air flow opening structure and housing adapted and configured to generate a directional air flow within the second portion of the housing as the motor operates, wherein the housing is configured so that the directional airflow generated by operating the motor will flow into the second portion of the interior, past the motor controller, then out of the interior.

2. The motor assembly of claim 1, wherein the motor controller comprises a timing circuit and the event is the expiration of a pre-set period of time, the motor controller adapted to cause the motor to operate at a high speed for the pre-set period of time and after the expiration of the pre-set period of time, operate at the low speed.

3. The motor assembly of claim 1, wherein the motor is operatively connected to a pump to cause the pump to operate at a fast speed or a slower low speed.

4. The motor assembly of claim 2, wherein the motor is operatively connected to a pump to cause the pump to operate at a first speed or a slower second speed and the pre-set period of time is determined to be long enough to permit the pump to finish sufficient priming.

5. The motor assembly of claim 1, wherein the motor is operatively connected to a pump to cause the pump to operate at a first speed or a slower second speed and the pump has an outlet and a pressure detector to monitor the pressure at the pump outlet and the event is the detection of a pressure at the pump outlet reaching a pre-set threshold pressure and the pressure detector is adapted to send a signal to the motor controller indicating that the event has occurred.

6. The motor assembly of claim 5, wherein the threshold pressure is set to a pressure indicating the pump has completed sufficient priming.

7. The motor assembly of claim 1, further comprising at least one light indicator to indicate the operating speed of the motor.

8. The motor assembly of claim 3, wherein the housing has an end cap with a tubularly shaped interior space, the motor controller has a substantially semi-circular configuration and the motor controller is mounted within the tubular space of the end cap.

9. The motor assembly of claim 1, wherein the housing has an end cap mounted to an end thereof and enclosing the second portion with the motor controller mounted within the end cap, the end cap comprising:
   a first surface;
   a second surface offset from the first surface and substantially parallel to the first surface;
   the air flow opening structure including at least one air grate structure positioned between the first surface and the second surface and substantially perpendicular to the first surface and the second surface in a stepped configuration, the air grate structure including at least a first air grate configured to permit air to flow into the end cap and a second air grate configured to permit air to flow out of the end cap, as the motor operates.

10. The motor assembly of claim 9, wherein the end cap has a tubular shape and the motor controller has a substantially semi-circular shape configured to the inner surface of the end cap.

11. A method of operating a motor connected to a pump and a motor controller, comprising the steps of:
   activating a motor constructed and adapted to operate at a slow speed and a faster fast speed, in a first portion of a housing, the motor controller electrically coupled to a motor controller in a second portion of the housing, the motor operating a pump, the motor controller configured to automatically cause the motor to operate at the slow speed and the fast speed, without input from a user;
   operating the motor and pump at the fast speed for a pre-set amount of time, the operating motor causing air to flow from outside the housing, into the second portion of the housing, over the controller; and then out of the second portion;

after the expiration of the pre-set amount of time, automatically switching the speed of the motor by the controller to the slow speed.

12. The method of operating a motor of claim 11, wherein the pre-set amount of time is determined to be a time period to permit the pump to undergo sufficient priming.

13. The method of operating a motor of claim 12, further comprising indicating by at least one light indicator, whether the motor is operating at the fast speed or the slow speed.

14. The method of claim 11, wherein the housing has an end cap enclosing the second portion at an end thereof, the controller is mounted in the end cap and the end cap includes at least two air grates, and causing air to flow into and out of the interior of the end cap through the air grates as the motor operates.

15. The method of claim 14, wherein the end cap interior is tubular and the motor controller is semi-circular and matches the inside surface of the end cap and wherein the air is caused to flow in a pattern affected by the inside surface of the end cap.

16. A method of operating a motor connected to a pump and a controller, comprising the steps of:

providing a motor in a first portion of a housing and a motor controller in a second portion of the housing, the motor operatively coupled to a pump and the motor controller configured or programmed to automatically cause the motor to operate at a fast speed until a pre-set pressure level is detected at the pump outlet and then to cause the motor to operate slow speed, slower than the fast speed, after the pre-set pressure level is detected;

receiving pressure data at the controller, indicating an output pressure of the pump;

operating the motor at the fast speed, causing air to flow from outside the housing, into the second portion and out of the second portion until the controller receives a signal indicating that the pre-set pressure level is reached, then the controller automatically causing the motor to operate at the slow speed without a need for a user to affect the motor speed.

17. The method of operating a pump of claim 16, wherein the pre-set pressure is a pressure level indicating the pump has completed sufficient priming.

18. The method of operating a pump of claim 17, further comprising indicating by at least one light indicator, whether the motor is operating at the fast speed or the slow speed.

19. The method of claim 16, wherein the housing has an end cap having an interior enclosing the second portion at an end thereof, the controller is mounted in the end cap and the end cap includes at an air grate and operating the motor causes air to flow through the air grate, into and then out of the second portion.

20. The method of claim 16, wherein the housing has an end cap at an end thereof, the controller is mounted in the end cap and the end cap includes at least one in-flow air grate and one exhaust air grate structure configured to permit air to flow through the end cap and past the controller cap and wherein the air is caused to flow in a pattern affected by the inside surface of the end cap.

* * * * *